United States Patent
Park et al.

(10) Patent No.: US 9,965,081 B2
(45) Date of Patent: May 8, 2018

(54) TOUCH SENSING DEVICE

(71) Applicants: Samsung Electronics Co., Ltd., Gyeonggi-do (KR); Korean Advanced Institute of Science and Technology, Daejeon (KR)

(72) Inventors: Sung-Soo Park, Gyeonggi-do (KR); Chang-Byung Park, Daejeon (KR); Gyu-Hyeong Cho, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 224 days.

(21) Appl. No.: 14/696,755

(22) Filed: Apr. 27, 2015

(65) Prior Publication Data
US 2015/0309655 A1    Oct. 29, 2015

(30) Foreign Application Priority Data

Apr. 25, 2014    (KR) .................. 10-2014-0049827

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0418* (2013.01)

(58) Field of Classification Search
CPC ....... G06F 3/0416; G06F 3/0418; G06F 3/044
See application file for complete search history.

(56) References Cited

U.S. PATENT DOCUMENTS 6,191,648 B1 *    2/2001    Lewicki ............... H03H 19/004
                                                          327/337
8,049,732 B2    11/2011    Hotelling et al.
(Continued)

FOREIGN PATENT DOCUMENTS

JP    2003-163582    6/2003

*Primary Examiner* — Patrick Edouard
*Assistant Examiner* — Joseph Fox
(74) *Attorney, Agent, or Firm* — The Farrell Law Firm, P.C.

(57) ABSTRACT

A device for sensing a touch by measuring a variation in capacitance according to a contact of an object, and measuring a contact position of the object is provided. The device includes a touch screen panel comprising grid electrodes forming a plurality of electrode patterns, the grid electrodes serving as Tx antennas or Rx antennas, a Tx circuit unit connected with the grid electrode to apply an electric signal to the touch screen panel unit, an Rx circuit unit connected with the grid electrodes to sense variations in the capacitance in the plurality of electrode patterns, and a controller configured to control the touch screen panel unit, the Tx circuit unit, and the Rx circuit unit. The Rx circuit unit includes a first operational amplifier, a first feedback capacitor, and a second feedback capacitor. The first feedback capacitor and the second feedback capacitor are connected with the first operational amplifier. Both terminals of the first feedback capacitor and the first operational amplifier are connected through a first switching unit. The first switching unit includes a 1-1 switch and a 1-2 switch, which are controlled to be short-circuited at a first phase of the electric signal. Both terminals of the second feedback capacitor and the first operational amplifier are connected through a second switching unit. The second switching unit includes a 2-1 switch and a 2-2 switch, which are controlled to be short-circuited at a second phase of the electric signal. The controller is further configured to short-circuit the first (Continued)

switching unit and the second switching unit, at different times, to store charges in each of the first feedback capacitor and the second feedback capacitor.

9 Claims, 13 Drawing Sheets

(56) References Cited

U.S. PATENT DOCUMENTS

| | | | | |
|---|---|---|---|---|
| 2011/0090173 A1* | 4/2011 | Huang | ............... | G06F 3/044 |
| | | | | 345/174 |
| 2011/0102061 A1* | 5/2011 | Wang | ............... | G06F 3/044 |
| | | | | 327/517 |
| 2011/0273400 A1 | 11/2011 | Kwon et al. | | |
| 2013/0307812 A1* | 11/2013 | Hanssen | ............. | G06F 3/044 |
| | | | | 345/174 |

* cited by examiner

TOUCH SENSING DEVICE

PRIORITY

This application claims priority under 35 U.S.C. § 119(a) to Korean Application Serial No. 10-2014-0049827, which was filed in the Korean Intellectual Property Office on Apr. 25, 2014, the entire content of which is incorporated herein by reference.

BACKGROUND

1. Field of the Invention

The present invention relates generally to a touch sensing device.

2. Description of the Related Art

Mobile devices, such as smart phones, have generally adopted a touch screen panel to implement various functions. In the past, a resistive touch screen was widely used, but when the resistive touch screen is used, there is a problem in that the image quality of the display deteriorates, therefore, a capacitive touch screen has been mainly used in recent days. As the touch screen is commonly used in a mobile device, there exists a demand for the development of a technique capable of more stably sensing a touch input in a environment in which noise exists. That is, in order to improve the sensitivity of a signal in a touch screen, effective cancellation of noise is necessary.

FIG. 1 is a circuit diagram illustrating an inverting integral circuit combined with a non-inverting integral circuit to cancel noise, according to the prior art. Referring to FIG. 1, the related art for cancelling noise uses a first integrator or a second integrator according to a clock signal.

However, according to the related art for cancelling noise, a separate operational amplifier for each capacitor is needed in order to accumulate charges in the two feedback capacitors Cfb1 and Cfb2. Accordingly, since it is necessary to accumulate charges for a plurality of signal cycles, there is a problem in that the sizes of the capacitors Cfb1 and Cfb2 need to be increased in order to increase a dynamic range.

SUMMARY

The present invention has been made to address at least the aforementioned problems and disadvantages, and to provide at least the advantages described below.

Accordingly, an aspect of the present invention is to provide a touch sensing device capable of effectively cancelling a noise while the size of a receiving unit, which is electrically connected with a touch screen panel unit, is minimized by connecting two feedback capacitors to one operational amplifier.

Accordingly, another aspect of the present invention is to provide a receiving unit capable of implementing a high dynamic range by performing an offset compensation function using an offset compensation circuit having a small size.

In accordance with an aspect of the present invention a device for sensing a touch, which measures a variation in capacitance according to a contact of an object, and measures a contact position of the object is provided. The device includes a touch screen panel including grid electrodes forming a plurality of electrode patterns, the grid electrodes serving as Tx antennas or Rx antennas, a Tx circuit unit connected with the grid electrode to apply an electric signal to the touch screen panel unit, an Rx circuit unit connected with the grid electrodes to sense variations in the capacitance in the plurality of electrode patterns, and a controller configured to control the touch screen panel unit, the Tx circuit unit, and the Rx circuit unit. The Rx circuit unit includes a first operational amplifier, a first feedback capacitor, and a second feedback capacitor. The first feedback capacitor and the second feedback capacitor are connected with the first operational amplifier. Both terminals of the first feedback capacitor and the first operational amplifier are connected through a first switching unit. The first switching unit includes a 1-1 switch and a 1-2 switch, which are controlled to be short-circuited at a first phase of the electric signal. Both terminals of the second feedback capacitor and the first operational amplifier are connected through a second switching unit. The second switching unit includes a 2-1 switch and a 2-2 switch, which are controlled to be short-circuited at a second phase of the electric signal. The controller is further configured to short-circuit the first switching unit and the second switching unit, at different times, to store charges in each of the first feedback capacitor and the second feedback capacitor.

In accordance with another aspect of the present invention, a device for sensing a touch, which measures a variation in capacitance according to a contact of an object, and measures a contact position of the object is provided. The device includes a touch screen panel including grid electrodes forming a plurality of electrode patterns, the grid electrodes servicing as Tx antennas or Rx antennas, a Tx circuit unit connected with the grid electrode to apply an electric signal to the touch screen panel unit, and an Rx circuit unit connected with the grid electrodes to sense variations in capacitance in the plurality of electrode patterns. The Rx circuit unit includes a first integrator and a second integrator. The first integrator includes a first feedback capacitor and a second feedback capacitor. The first feedback capacitor and the second feedback capacitor store charges according to a positive signal and a negative signal input to the Rx circuit, respectively. The second integrator integrates the charges of the first feedback capacitor and the second feedback capacitor with charges of an offset compensation capacitor having predetermined charges stored.

According to yet another aspect of the present invention, a device for sensing a touch, which measures a variation in capacitance according to a contact of an object, and measures a contact position of the object is provided. The device includes a touch screen panel including grid electrodes forming a plurality of electrode patterns, the grid electrodes serving as Tx antennas or Rx antennas, a Tx circuit unit connected with the grid electrode to apply an electric signal to the touch screen panel unit, and an Rx circuit unit connected with the grid electrodes to sense variations in the capacitance in the plurality of electrode patterns. The Rx circuit unit includes a first integrator and a second integrator. The first integrator includes a first feedback capacitor and a second feedback capacitor. The first feedback capacitor and the second feedback capacitor store charges according to a positive signal and a negative signal input to the Rx circuit, respectively. The second integrator integrates a capacitance of the first feedback capacitor with a compensation current output from a compensation current supply, where the compensation current supply outputs a predetermined offset compensation current, for a predetermined period of time.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention will now be described more fully with reference to the accompanying drawings in which particular embodiments are shown, but the present invention include various changes and modifications, and have various embodiments. However, the embodiments do not limit the present invention to a specific implementation, but should be construed as including all modifications, equivalents, and replacements included in the spirit and scope of the present invention.

Although the terms, including an ordinal number such as first, second, etc., can be used for describing various elements, the structural elements are not restricted by the terms. The terms are only used to distinguish one element from another element. For example, without departing from the scope of the present invention, a first structural element may be referred to as a second structural element. Similarly, the second structural element also may be referred to as the first structural element. As used herein, the term "and/or" includes any and all combinations of one or more associated items.

The terms used in this application are for the purpose of describing particular embodiments only and are not intended to limit the invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existences or probability of the addition of one or more other features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. It should be interpreted that the terms, which are identical to those defined in general dictionaries, have meanings identical to that in the context of the related technique. The terms should not be ideally or excessively interpreted by their formal meaning.

An electronic device, in which a touch sensing device according to various embodiments of the present invention is provided, may be a smart phone, a tablet PC, a digital camera, and the like. According to various embodiments of the present invention, a smart phone is described herein as an example of an electronic device having a touch sensing device. However, an electronic device in which a touch sensing device is provided, is not limited to a smart phone.

Figure 1:
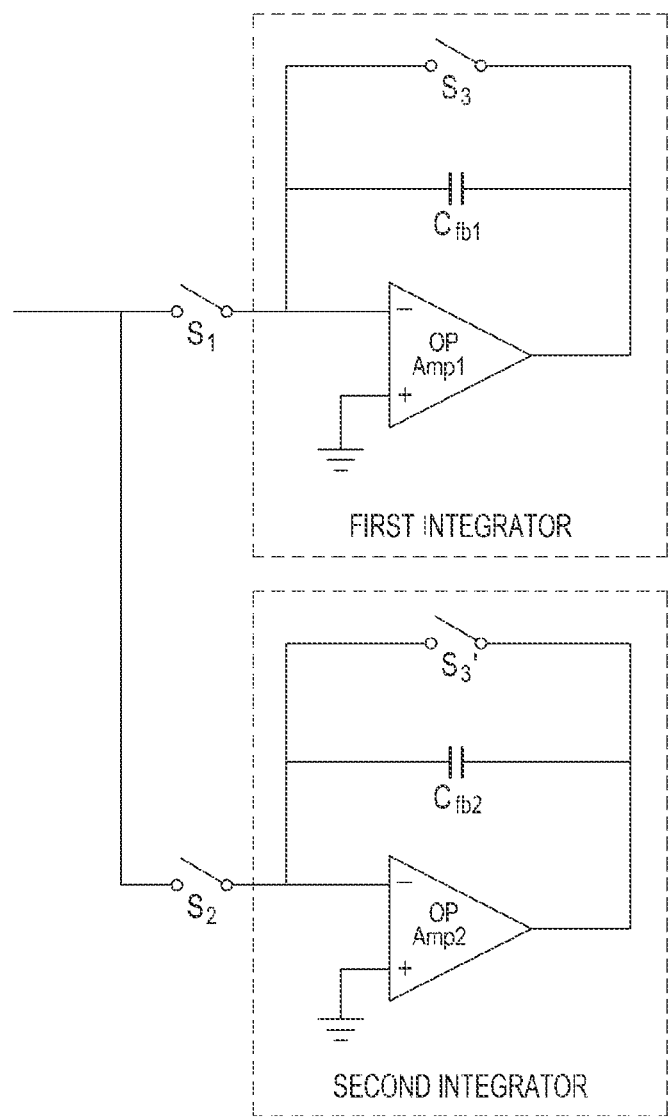
FIG. 1 is a circuit diagram illustrating an inverting integral circuit combined with a non-inverting integral circuit to cancel noise, according to the prior art.
Figure 2:
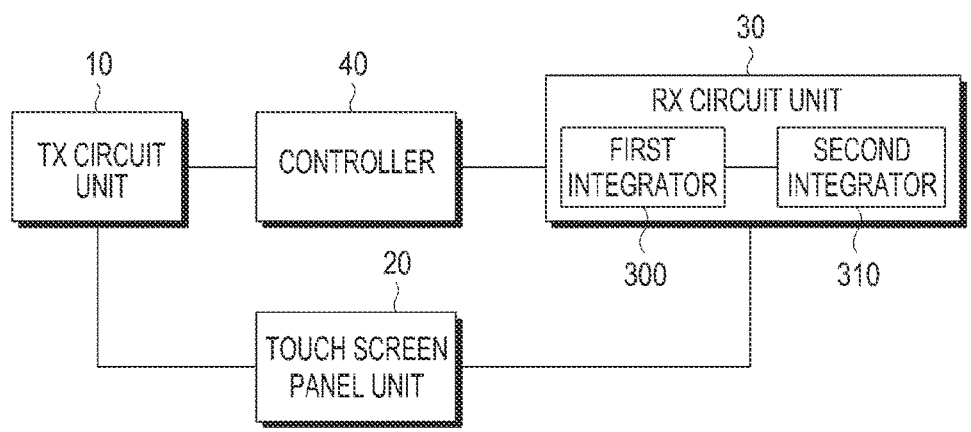
FIG. 2 is a block diagram schematically illustrating a touch sensing device, according to an embodiment of the present invention.
Figure 3:
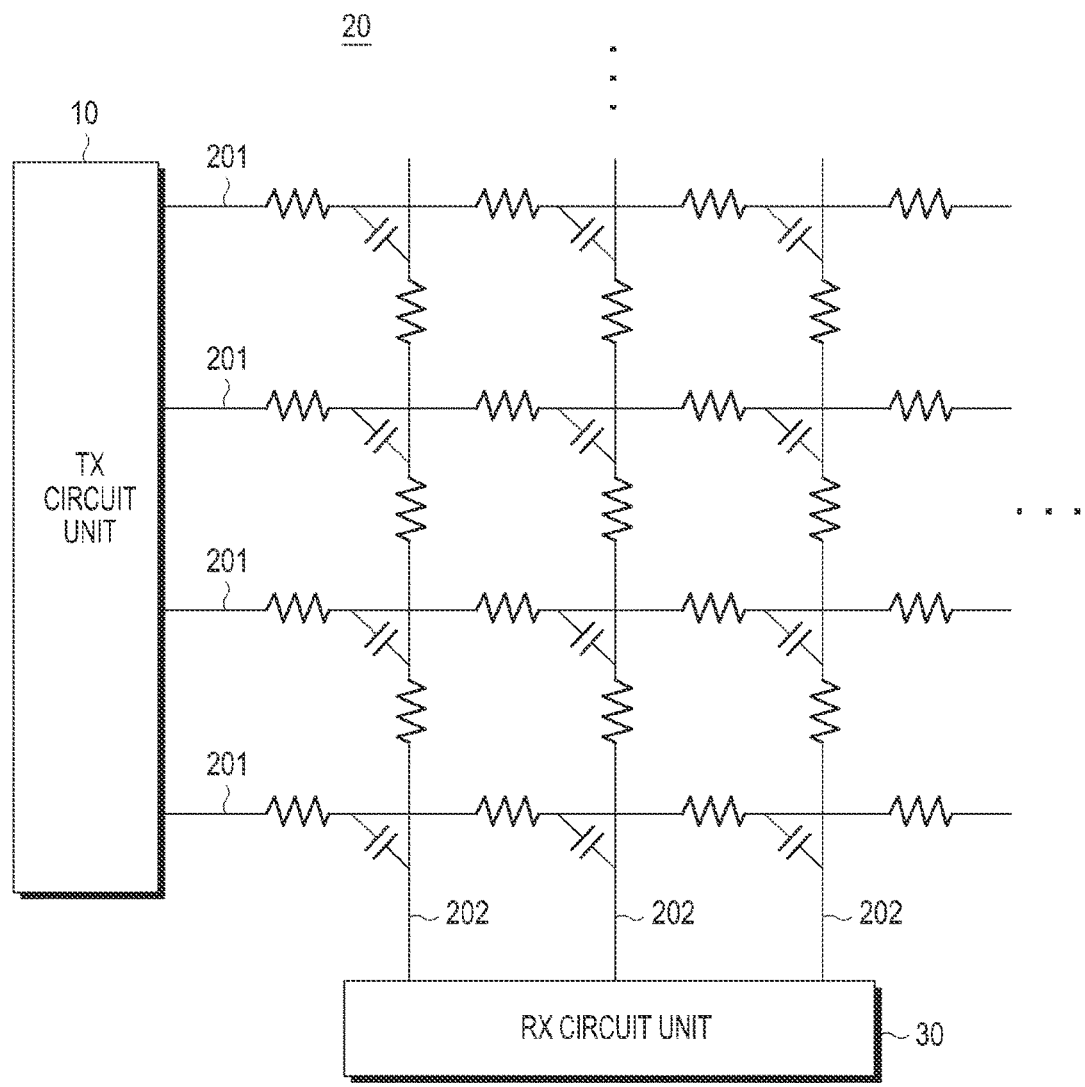
FIG. 3 is a schematic circuit diagram illustrating a Tx circuit unit and an RX circuit unit for recognizing a touch in a touch sensing device, according to an embodiment of the present invention.

FIG. 2 is a block diagram schematically illustrating a touch sensing device, according to an embodiment of the present invention, and FIG. 3 is a schematic circuit diagram illustrating a Tx circuit unit and an Rx circuit unit for recognizing a touch in a touch sensing device, according to an embodiment of the present invention.

Referring to FIG. 2, a touch sensing device according to an embodiment of the present invention includes a Tx circuit unit 10, a touch screen panel unit 20, a Rx circuit unit 30, and a controller 40.

The Tx circuit unit 10 may be electrically connected with the touch screen panel unit 20 to apply various electric signals for controlling the touch screen panel unit 20. The electric signal may be a pulse signal for measuring a variation of capacitance, though the electric signal is not limited thereto.

Referring to FIG. 3, the electric signal is applied to a Tx antenna 201 electrically connected with the Tx circuit unit 10. An Rx antenna 202 is electrically connected with the Rx circuit unit 30.

As illustrated in FIG. 3, in the touch screen panel unit 20, the Tx antenna 201 and the Rx antenna 202 are disposed in a form of an orthogonal coordinate system to form a plurality of electrode patterns. In some embodiments of the present invention, the Tx antenna 201 may be called a driving electrode, and the Rx antenna 202 may be called a sensing electrode.

The Rx circuit unit 30 is electrically connected with the Rx antenna 202 to sense a variation of capacitance of the touch screen panel unit 20. The sensing of the variation of the capacitance is the sensing of a variation of capacitance of the touch screen panel unit 20 according to a touch input by a finger of a user. However, noise may enter the Rx circuit unit 30. Further, in order to implement a high Signal-to-Noise Ratio (SNR) of the touch screen, it is necessary to design the Rx circuit unit 30 so that the noise is effectively cancelled. The Rx circuit unit 30 includes a first integrator 300 for cancelling the entering noise and a second integrator 320 for compensating for offset capacitance. The first integrator 300 and the second integrator 320 will be described below.

A controller 40 is electrically connected with the Tx circuit unit 10 and the Rx circuit unit 30 to control the Tx circuit unit 10 and the Rx circuit unit 30 to perform their respective functions or operations.

Figure 4:
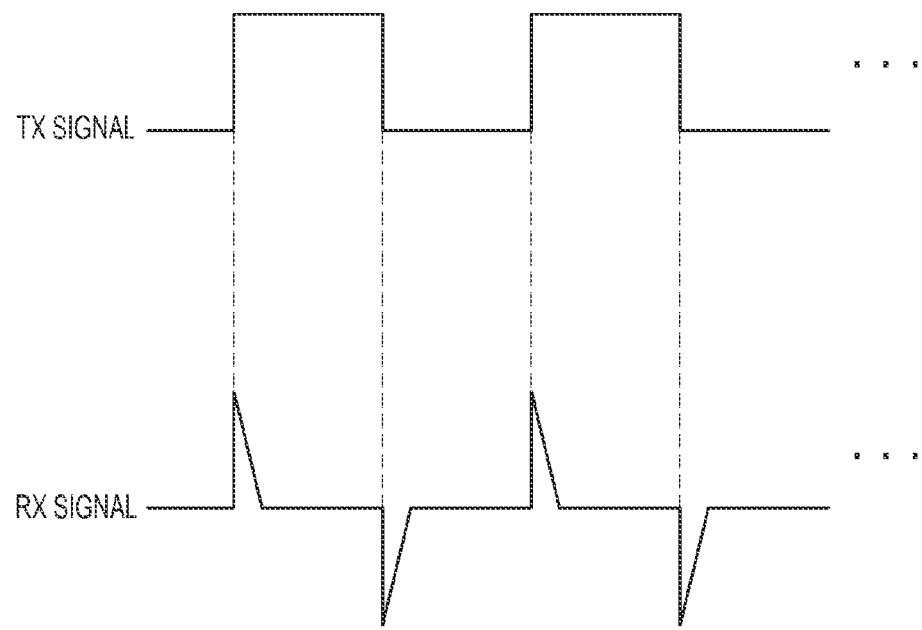
FIG. 4 schematically illustrates waveforms of a Tx signal and an Rx signal, according to an embodiment of the present invention.

FIG. 4 schematically illustrates waveforms of a Tx signal and an Rx signal, according to an embodiment of the present invention.

Referring to FIG. 4, the Tx circuit unit 10 applies a Tx signal. The waveform of the Tx signal may be, for example, a periodical symmetric square wave as illustrated in FIG. 4. In the present specification, for convenience of the description, the Tx signal may be referred to as an electric signal in some cases. According to the Tx signal, an Rx input signal is applied to an input terminal of the Rx circuit unit 30. That is, positive (+) charges are applied to the input terminal of the Rx circuit unit 30 in an increase section of the electric signal, and negative (−) charges are applied to the input terminal of the Rx circuit unit 30 in a decrease section of the electric signal.

Figure 5:
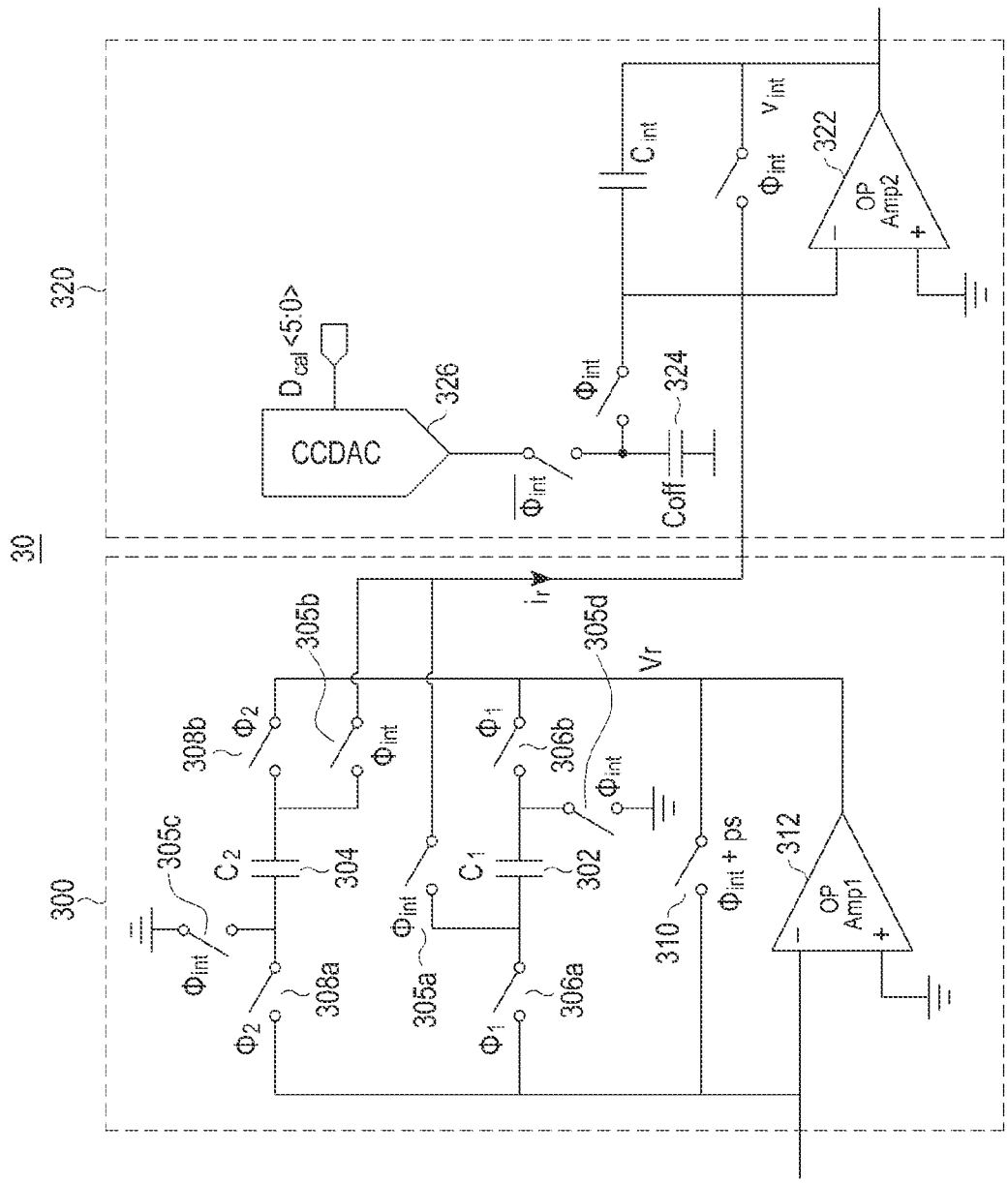
FIG. 5 is a circuit diagram illustrating a first integrator and a second integrator included in an Rx circuit unit, according to an embodiment of the present invention.

FIG. 5 is a circuit diagram illustrating a first integrator and a second integrator included in an Rx circuit unit, according to an embodiment of the present invention.

Referring to FIG. 5, the first integrator 300 includes a first operational amplifier 312, a first feedback capacitor 302, and a second feedback capacitor 304. The first feedback capacitor 302 and the second feedback capacitor 304 are electrically connected with the first operational amplifier 312.

The first integrator 300 further includes a 1-1 switch 306a and a 1-2 switch 306b which are connected to opposite terminals of the first feedback capacitor 302. The 1-1 switch 306a and the 1-2 switch 306b may together be referred to as a first switching unit 306a and 306b in the present specification as necessary. The first switching unit 306a and 306b is short-circuited at a first phase, and the function and the operation are controlled by the controller 40.

The first integrator 300 further includes a 2-1 switch 308a and a 2-2 switch 308b which are connected to opposite terminals of the second feedback capacitor 304. The 2-1 switch 308a and the 2-2 switch 308b may together be referred to as a second switching unit 308a and 308b in the present specification as necessary. The second switching unit 308a and 308b is short-circuited at a second phase, and the function and the operation are controlled by the controller 40.

Further, the first integrator 300 includes a third switching unit 305a, 305b, 305c, and 305d which is controlled to be short-circuited at a third phase of an electric signal. The third switching unit 305a, 305b, 305c, and 305d includes a 3-1 switch 305a, a 3-2 switch 305b, a 3-3 switch 305c, and a 3-4 switch 305d.

The 3-1 switch 305a and the 3-2 switch 305b are controlled to be short-circuited at the third phase in order to output charges stored in the first feedback capacitor 302 and the second feedback capacitor 304. This will be described in more detail below.

The 3-3 switch 305c and the 3-4 switch 305d are controlled to be short-circuited at the third phase of the electric signal, so that the first feedback capacitor 302 and the second feedback capacitor 304 may be grounded or connected to a constant voltage power supply.

The first integrator 300 further includes a reset switch 310 for resetting the first operational amplifier 312. The reset switch 310 is controlled by the controller 40 so that the reset switch 310 is short-circuited according to a command, included in the electric signal, to perform reset of the first operational amplifier 312.

The second integrator 320 includes a second operational amplifier 322 and an offset compensation capacitor 324. Further, the offset compensation capacitor 324 is electrically connected with a Constant Current D/A Converter (CCDAC) 326.

Figure 6:
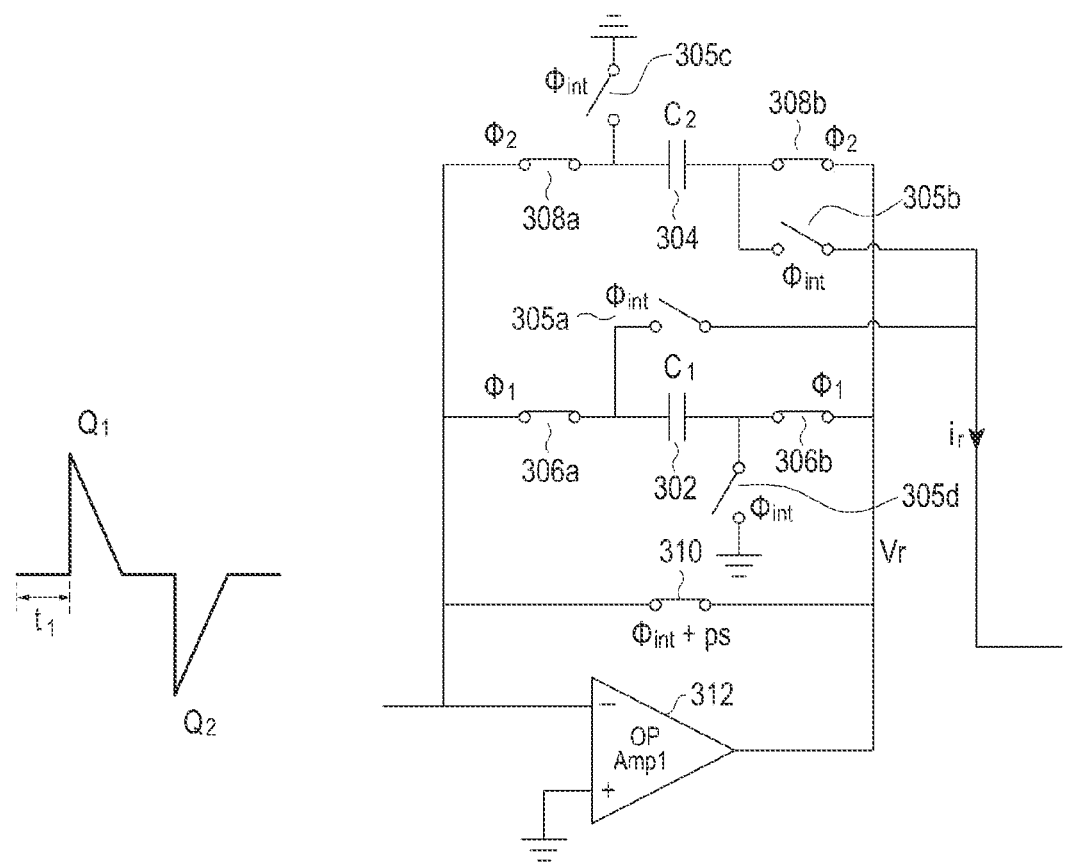
FIG. 6 schematically illustrates a circuit connection state in a first integrator at a first time, according to an embodiment of the present invention.

FIG. 6 schematically illustrates a circuit connection state in a first integrator at a first time, according to an embodiment of the present invention.

Referring to FIG. 6, a first time is a time at which the first operational amplifier 312, the first feedback capacitor 302, and the second feedback capacitor 304 are reset. To this end, at the first time, the reset switch 310, the first switching unit 306a and 306b, and the second switching unit 308a and 308b are controlled to be short-circuited for a predetermined time, for example, for several pico seconds (ps), to reset the first operational amplifier 312, the first feedback capacitor 302, and the second feedback capacitor 304.

Figure 7:
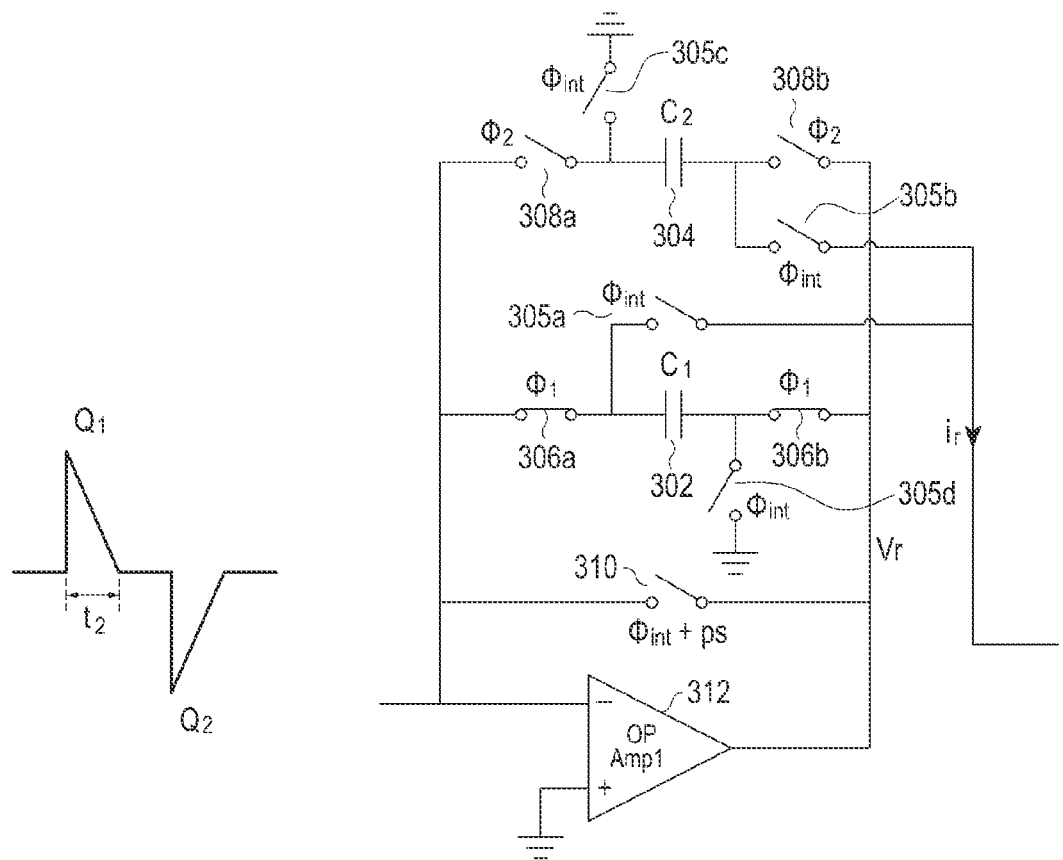
FIG. 7 schematically illustrates a circuit connection state in a first integrator at a second time, according to an embodiment of the present invention.

FIG. 7 schematically illustrates a circuit connection state in the first integrator at a second time, according to an embodiment of the present invention.

Referring to FIG. 7, positive (+) charges $Q_1$ are applied to the first integrator 300 at a second time. The controller 40 controls so that only the first switching unit 306a and 306b is short-circuited at the second time, that is, at a second phase of the electric signal. Accordingly, both terminals of the first feedback capacitor 302 are charged to have $+Q_1$ and $-Q_1$ charges.

Figure 8:
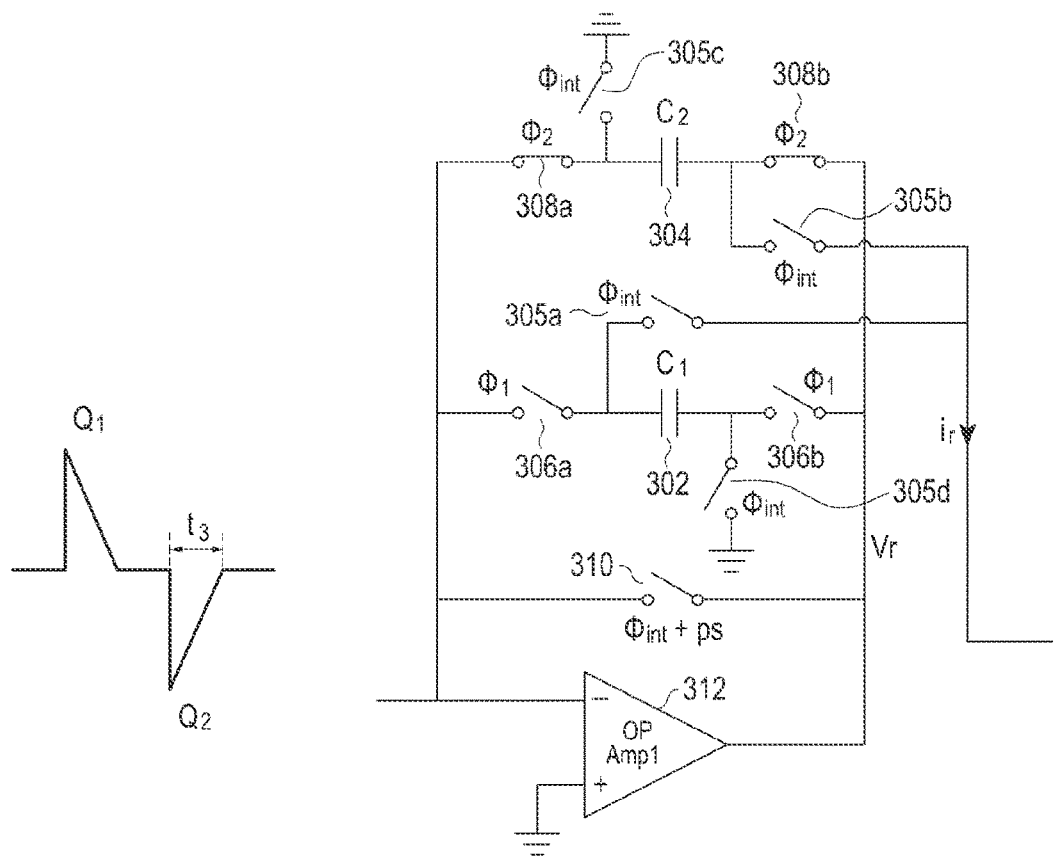
FIG. 8 schematically illustrates a circuit connection state in a first integrator at a third time, according to an embodiment of the present invention.

FIG. 8 schematically illustrates a circuit connection state in the first integrator at a third time, according to an embodiment of the present invention.

Referring to FIG. 8, negative (−) charges $Q_2$ are applied to the first integrator 300 at a third time. The controller 40 controls so that only the second switching unit 308a and 308b are short-circuited at the third time, that is, at the second phase of the electric signal. Accordingly, both terminals of the second feedback capacitor 304 are charged to have $-Q_2$ and $+Q_2$ charges, as illustrated in FIG. 9.

Figure 9:
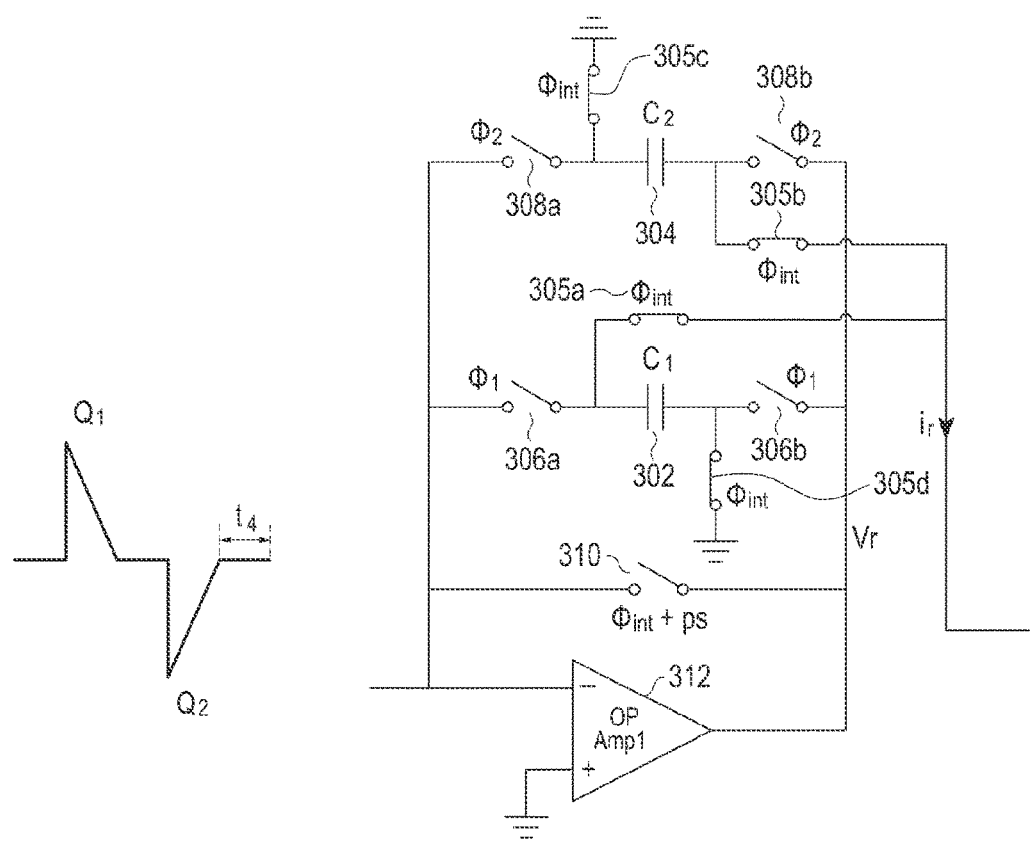
FIG. 9 schematically illustrates a circuit connection state in a first integrator at a fourth time, according to an embodiment of the present invention.

FIG. 9 schematically illustrates a circuit connection state in a first integrator at a fourth time, according to an embodiment of the present invention.

Figure 10:
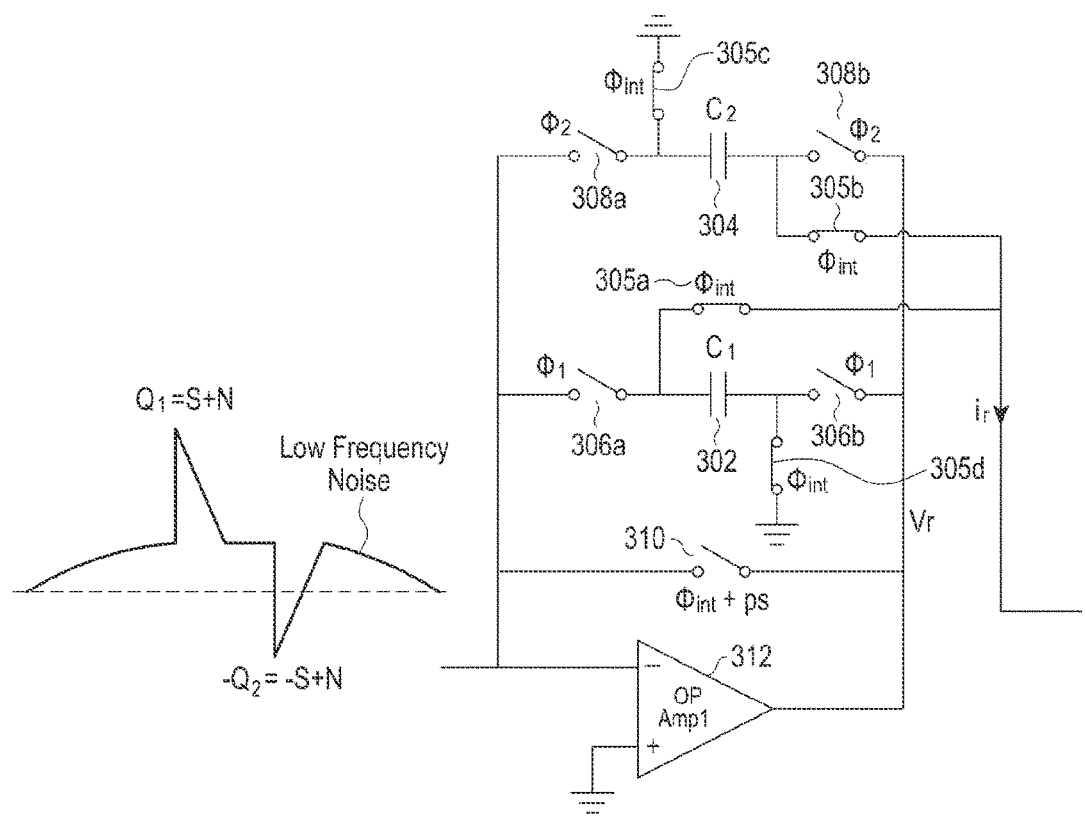
FIG. 10 schematically illustrates a circuit connection state in a first integrator when a noise enters at a fourth time, according to an embodiment of the present invention.

Referring to FIG. 9, at a fourth time, the first feedback capacitor 302 and the second feedback capacitor 304 are connected in parallel to output charges stored in the first feedback capacitor 302 and the second feedback capacitor 304, respectively. The controller 40 controls so that only the third switching unit 305a, 305b, 305c, and 305d is short-circuited at the fourth time, that is, the third phase of the electric signal. The third switching unit 305a, 305b, 305c, and 305d is short-circuited, so that the first feedback capacitor 302 and the second feedback capacitor 304 are connected in parallel. As described above, the 3-3 switch 305c and the 3-4 switch 305d are short-circuited, so that the first feedback capacitor 302 and the second feedback capacitor 304 may be grounded or connected with a constant voltage power supply. However, charges for noise, as well as charges for an input signal, may be included in the charges stored in the respective capacitors 302 and 304 as described above. FIG. 10 schematically illustrates a circuit connection state in a first integrator when a noise enters at a fourth time, according to an embodiment of the present invention.

Referring to FIG. 10, in a portable device including a touch display, a low frequency noise slower than a frequency of a pulse used for measuring capacitance may enter. An input signal S and a signal for a lower frequency noise +N are included in the positive charges $Q_1$. Further, an input signal −S and a signal for a lower frequency noise +N are included in the negative charges $Q_0$. In the case where the first feedback capacitor 302 and the second feedback capacitor 304 are connected in parallel, a combined charge amount of the first integrator 300 is a sum of the charges stored in the first feedback capacitor 302 and the second feedback capacitor 304, thereby being expressed as Equation (1) below.

$$Q=Q1-(-Q2)=S+N-(-S+N)=2S \qquad \text{Equation (1)}$$

Accordingly, the low frequency noises +N are mutually offset, so that only an input signal 2S is output.

Figure 11:
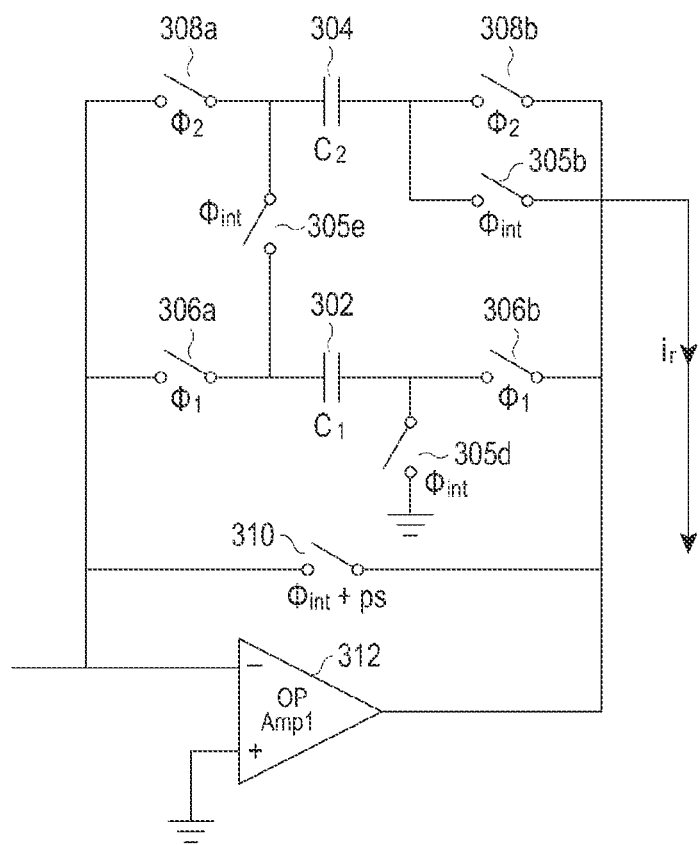
FIG. 11 schematically illustrates a circuit connection state in a first integrator, according to another embodiment of the present invention.

FIG. 11 schematically illustrates a circuit connection state in a first integrator, according to another embodiment of the present invention.

Referring to FIG. 11, a first integrator 300, according to another embodiment of the present invention. is configured so that a first feedback capacitor 302 and a second feedback capacitor 304 are serially connected. Except for the first feedback capacitor 302 and the second feedback capacitor 304 being configured to be serially connected at a fourth time, that is, at a third phase, so that charges stored in the first feedback capacitor 302 and the second feedback capacitor 304 are output, the descriptions related to FIGS. 6 to 9 are identically applied to an operation of the first integrator 300, according to another embodiment of the present invention. Accordingly, a detailed description of the operation of the first integrator 300, according to another embodiment of the present invention will be omitted.

Figure 12:
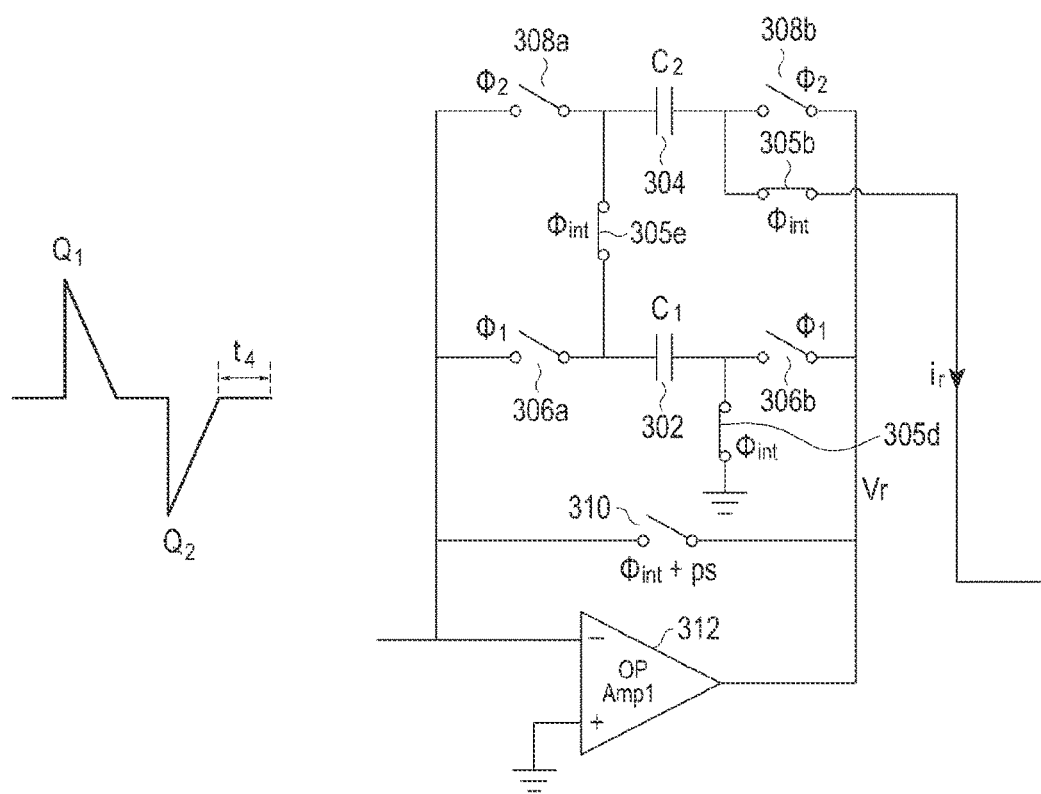
FIG. 12 schematically illustrates a circuit connection state in a first indicator, having a first feedback capacitor and a second feedback capacitor serially connected, at a fourth time, according to the other embodiment of the present invention.

FIG. 12 schematically illustrates a circuit connection state in a first indicator, having a first feedback capacitor and a second feedback capacitor serially connected, at a fourth time, according to an embodiment of the present invention.

Referring to FIG. 12, the first feedback capacitor 302 and the second feedback capacitor 304 are configured to serially connect at a fourth time. The controller 40 controls so that a third switching unit 305b, 305d, and 305e is short-circuited at the fourth time. In the case where the first feedback capacitor 302 and the second feedback capacitor 304 are serially connected, the combined capacitance of the capacitance of the first feedback capacitor 302 and the capacitance of the second feedback capacitor 304 is expressed by Equation (2) below.

$$C=C1\times C2/(C1+C2) \qquad \text{Equation (2)}$$

Further, a difference $\Delta Q$ in a charge amount is expressed by Equation (3) below.

$$\begin{aligned}\Delta Q &= Q2-(-Q1)\\&=Q2+Q1\end{aligned} \qquad \text{Equation (3)}$$

Further, a potential difference $\Delta V$ is expressed by Equation (4) below.

$$\Delta V=\Delta Q/C \qquad \text{Equation (4)}$$

When the capacitance of the first feedback capacitor 302 is the same as the capacitance of the second feedback capacitor 304, and a charge amount $Q_1$ charged in the first feedback capacitor 302 is the same as a charge amount $Q_2$ charged in the second feedback capacitor 304, a potential difference $\Delta V$ is expressed by Equation (5) below.

$$\begin{aligned}\Delta V &= \Delta Q/C\\&=2Q1/(0.5\times C1)\\&=4Q1/C1\end{aligned} \qquad \text{Equation (5)}$$

As described above, even when the first feedback capacitor 302 and the second feedback capacitor 304 are serially connected, low frequency noise components may be mutually offset as described in Equation (1). Accordingly, it can be seen that even when the first feedback capacitor 302 and the second feedback capacitor 304 are serially connected, noises may be cancelled, and as expressed in Equation (5), total capacitance of the first integrator 300 is decreased, so that a output voltage is increased compared to the case where a single capacitor is used.

In the case where a predetermined touch on a touch display is sensed based on a variation in capacitance, capacitance having a predetermined value (offset capacitance) may exist even in the case where the touch is not created. The offset capacitance causes a decrease of a dynamic range in a portable device, including the touch display device. Accordingly, a circuit that is capable of minimizing the offset capacitance is needed, and thus, the touch sensing device, according to the embodiment of the present invention, includes a circuit that is capable of minimizing the offset capacitance.

Figure 13:
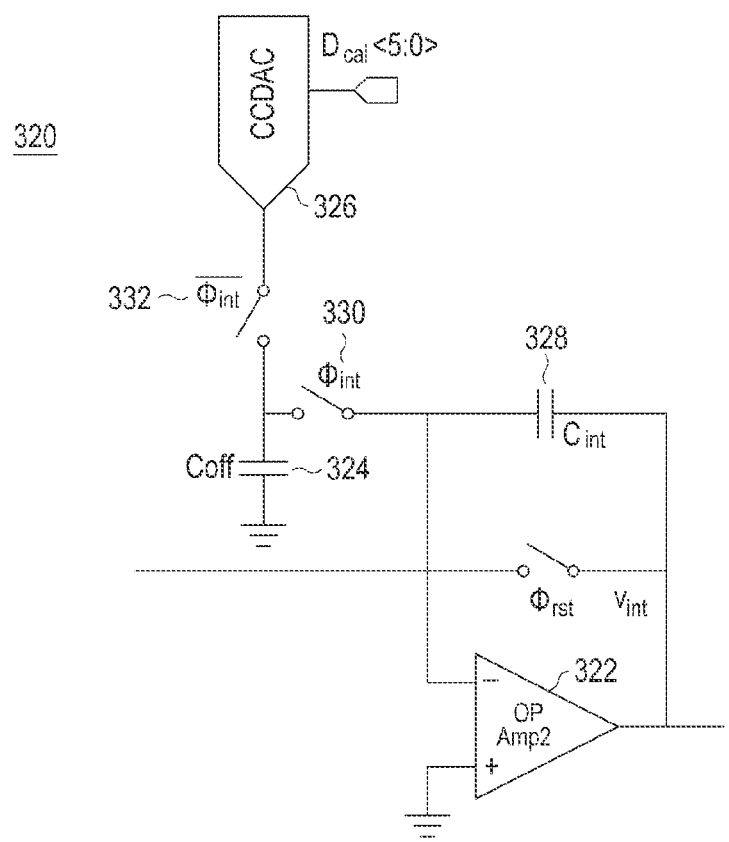
FIG. 13 is a schematic circuit diagram illustrating the case where an offset compensation capacitor is included in the second integrator according to the embodiment of the present invention.

FIG. 13 is a schematic circuit diagram illustrating an offset compensation capacitor included in a second integrator, according to an embodiment of the present invention.

Referring to FIG. 13, the offset compensation capacitor 324 is charged for a predetermined time by the CCDAC. When the charges of the first feedback capacitor 302 and the second feedback capacitor 304, charged by the first integrator 300, are output to the second integrator 320, a charge amount as much as the amount charged in the offset compensation capacitor 324 is transmitted to a third feedback capacitor 328. Accordingly, the offset charges are offset, so that it is possible to prevent the dynamic range from being decreased due to the offset capacitance as described above.

For example, when a variation in capacitance, which needs to be sensed, is 0.1 pico Farad (pF), and offset capacitance generated in the touch screen panel unit 20 is 9.9 pF, a capacitor having capacitance of 10 pF is needed in order to sense a variation in the capacitance (for example, 0.1 pF) in the case where offset compensation does not exist. However, as described herein, when the offset compensation is applied, a capacitor having capacitance of 0.1 pF senses a variation in the capacitance (for example, 0.1 pF). Accordingly, an area of an internal capacitor for sensing a variation in capacitance is decreased. Accordingly, it is possible to decrease an area of the third feedback capacitor 328 of the second integrator.

The offset compensation capacitor 324 is electrically connected with the CCDAC 326, which serves as a current supply, to be charged. For example, a $\overline{\varphi_{int}}$ switch 332 is controlled to be short-circuited at the first phase and the second phase of the electric signal. Accordingly, the offset compensation capacitor 324 is charged. Further, for example, a $\varphi_{int}$ switch 330 is controlled to be short-circuited, and a $\overline{\varphi_{int}}$ switch 332 is controlled to be opened at the third phase of the electric signal, so that offset charges generated by the offset capacitance of the Rx circuit unit 30 may be compensated.

Further, in the embodiment illustrated in FIG. 13, the CCDAC 326 may also be replaced with a constant voltage power supply. That is, in the embodiment for the second integrator 320 illustrated in FIG. 13 is not limited to the case where the CCDAC is used, and a constant voltage DAC is used instead of the CCDAC.

Figure 14:
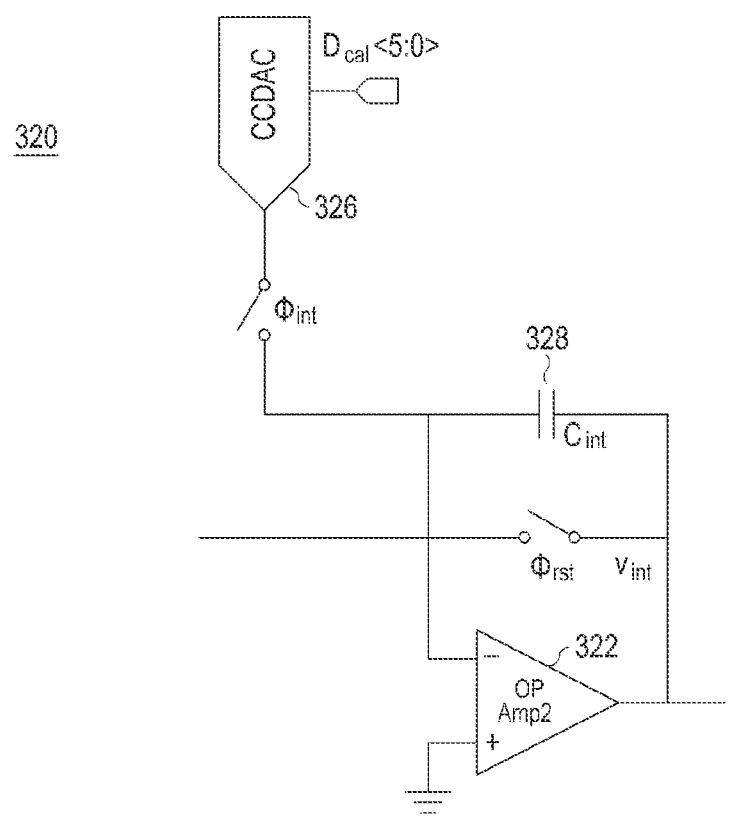
FIG. 14 is a schematic circuit diagram illustrating a circuit connection state, where a Constant Current D/A Converter (CCDAC) is used in a second integrator as a compensation current supply, according to another embodiment of the present invention.

FIG. 14 is a schematic circuit diagram illustrating a circuit connection state, where a Constant Current D/A Converter (CCDAC) is used in a second integrator as a compensation current supply, according to another embodiment of the present invention.

Referring to FIG. 14, in a second integrator 320 a CCDAC 326 is used as a compensation current supply instead of an offset compensation capacitor 324. That is, the controller 40 controls so that a compensation current having a predetermined value is generated by the CCDAC 326. A $\varphi_{int}$ switch is controlled to be short-circuited for a predetermined time. Accordingly, similar to the case in which the offset compensation capacitor 324 is used, it is possible to exhibit an offset compensation effect.

While embodiments of the present invention have been described with reference to the accompanying drawings, it will be understood by those skilled in the art that the present invention may be varied and modified without departing from the technical spirit and the essential feature of the present invention. Accordingly, it should be understood that the disclosed embodiments are merely and are not intended to limit the present invention. Therefore the scope of the inventive concept is defined not by the detailed description of embodiments of the present invention, but by the following claims and their equivalents.

What is claimed is:

1. A device for sensing a touch, which measures a variation in capacitance according to a contact of an object, and measures a contact position of the object, the device comprising:
   a touch screen panel comprising grid electrodes forming a plurality of electrode patterns, the grid electrodes serving as Tx antennas or Rx antennas;
   a Tx circuit unit connected with the grid electrode to apply an electric signal to the touch screen panel unit;
   an Rx circuit unit connected with the grid electrodes to sense variations in the capacitance in the plurality of electrode patterns; and
   a controller configured to control the Tx circuit unit and the Rx circuit unit,
   wherein the Rx circuit unit comprises a first operational amplifier, a first feedback capacitor, and a second feedback capacitor,
   the first feedback capacitor and the second feedback capacitor are connected with the first operational amplifier, and
   both terminals of the first feedback capacitor and the first operational amplifier are connected through a first switching unit,
   wherein the first switching unit comprises a switch, which is controlled to be short-circuited during a first time period, which is a period that a positive charge is applied to the Rx circuit unit according to a positive parity signal generated by the Tx circuit unit, such that the positive charge is applied to the first feedback capacitor,
   wherein both terminals of the second feedback capacitor and the first operational amplifier are connected through a second switching unit,
   wherein the second switching unit comprises a switch, which is controlled to be short-circuited during a second time period, which is a period that a negative charge is applied to the Rx circuit unit according to a negative parity signal generated by the Tx circuit unit,
   wherein the controller is further configured to short-circuit the first switching unit and the second switching unit, at different times, to store charges in each of the first feedback capacitor and the second feedback capacitor,
   wherein the Rx circuit unit includes an integrator,
   wherein the integrator includes an offset compensation capacitor which is charged during the first time period and the second time period, and discharged during a third time period which is a period that the first switching unit and the second switching unit are open, and
   wherein the controller measures the contact position of the object based on charge discharged from the integrator.

2. The device of claim 1, wherein the controller makes a control so that a terminal of the first feedback capacitor connected with a negative input terminal of the first operational amplifier and a terminal of the second feedback capacitor connected with an output terminal of the first operational amplifier are connected with an output terminal of the Rx circuit unit, makes a control so that the other terminals of the first feedback capacitor and the second capacitor are connected with a ground or a constant voltage power supply, respectively, and makes a control so that the charges charged in the first feedback capacitor and the second feedback capacitor are output while the switches of the first switching unit and the second switching unit are open.

3. The device of claim 2, wherein a terminal connected with a negative input terminal of the first operational amplifier and the terminal of the second feedback capacitor connected with the output terminal of the first operational amplifier are connected by a third switching unit during the third time period by the controller, and
   the controller makes a control so that the charges charged in the first feedback capacitor and the second feedback capacitor are output while the third switching unit are shorted.

4. The device of claim 1, wherein the controller makes a control so that a terminal of the first feedback capacitor connected with a negative input terminal of the first operational amplifier and a terminal of the second feedback capacitor connected with a negative input terminal of the first operational amplifier are connected with each other, makes a control so that the other terminal of the first feedback capacitor is connected with a ground or a constant voltage power supply, makes a control so that the other terminal of the second feedback capacitor is connected with an output terminal of the Rx circuit unit, and makes a control so that the charges charged in the first feedback capacitor and the second feedback capacitor are output while the switches of the first switching unit and the second switching unit are open.

5. The device of claim 4, wherein a terminal of the first feedback capacitor connected with a negative input terminal of the first operational amplifier and a terminal of the second feedback capacitor connected with the negative input terminal of the first operational amplifier are connected through a first switch of a third switching unit which is controlled to be short-circuited during the third time period by the controller, the other terminal of the second feedback capacitor is connected with an output terminal of the Rx circuit unit through a second switch of the third switching unit which is controlled to be short-circuited during the third time period by the controller, and the controller makes a control so that charges charged in the first feedback capacitor and the second feedback capacitor are output by controlling the third switching unit so that the third switching unit is short-circuited.

6. The device of claim 1, wherein the electric signal generated by the Tx circuit unit includes the positive parity signal and the negative parity signal, and the controller makes a control so that charges generated by the positive parity signal are charged in the first feedback capacitor, and charges generated by the negative parity signal are charged in the second feedback capacitor.

7. The device of claim 6, wherein the controller makes a control so that the first feedback capacitor and the second feedback capacitor are connected in parallel to output charges charged in the first feedback capacitor and the second feedback capacitor.

8. The device of claim 6, wherein the controller makes a control so that the first feedback capacitor and the second feedback capacitor are serially connected to output charges charged in the first feedback capacitor and the second feedback capacitor.

9. A device for sensing a touch, which measures a variation in capacitance according to a contact of an object, and measures a contact position of the object, the device comprising:

a touch screen panel comprising grid electrodes forming a plurality of electrode patterns, the grid electrodes servicing as Tx antennas or Rx antennas;

a Tx circuit unit connected with the grid electrode to apply an electric signal to the touch screen panel unit; and an Rx circuit unit connected with the grid electrodes to sense variations in capacitance in the plurality of electrode patterns, wherein the Rx circuit unit comprises:

a first integrator including a first feedback capacitor and a second feedback capacitor, wherein the first feedback capacitor and the second feedback capacitor store charges according to a positive signal and a negative signal input to the Rx circuit, respectively; and a second integrator that integrates the charges of the first feedback capacitor and the second feedback capacitor with charges of an offset compensation capacitor having predetermined charges stored, wherein the offset compensation capacitor, which is charged during a first time period and a second time period, and which is discharged during a third time period which is a period that the first switching unit and the second switching unit are open, wherein the first time period is a period that a positive charge is applied to the Rx circuit unit according to a positive signal generated by the Tx circuit unit, such the positive charge is applied to the first feedback capacitor, wherein the second time period is a period that a negative charge is applied to the Rx circuit unit according to a negative parity signal generated by the Tx circuit unit, such the negative charge is applied to the second feedback capacitor, and wherein a controller measures the contact position of the object based on charge discharged from the second integrator.

* * * * *